(12) United States Patent
Casella

(10) Patent No.: US 6,264,170 B1
(45) Date of Patent: Jul. 24, 2001

(54) ASSEMBLY FOR INSERTION OF A DRAW LINE IN A CONDUIT

(75) Inventor: David Wayne Casella, Malaga (AU)

(73) Assignee: Pneumatic Systems International Pty., Ltd., W.A. (AU)

( * ) Notice: Subject to any disclaimer, the term of this patent is extended or adjusted under 35 U.S.C. 154(b) by 0 days.

(21) Appl. No.: 09/381,194

(22) PCT Filed: Apr. 17, 1998

(86) PCT No.: PCT/AU98/00278

§ 371 Date: Sep. 17, 1999

§ 102(e) Date: Sep. 17, 1999

(87) PCT Pub. No.: WO98/47636

PCT Pub. Date: Oct. 29, 1998

(30) Foreign Application Priority Data

Apr. 17, 1998 (AU) ................................... PO 6284

(51) Int. Cl.[7] ........................................... B65H 59/00
(52) U.S. Cl. ........................................... 254/134.4
(58) Field of Search ................. 254/134.4, 134.3 FT, 254/134.3 R, 222; 137/1, 13, 808, 813, 828

(56) References Cited

U.S. PATENT DOCUMENTS 3,034,766 * 5/1962 Hamrick .......................... 254/134.4
5,246,207 * 9/1993 Horii et al. ...................... 254/134.4
5,730,424 * 3/1998 Flores ............................. 254/134.4

FOREIGN PATENT DOCUMENTS

46813 * 3/1911 (AT) ................................ 254/134.4

* cited by examiner

*Primary Examiner*—Robert C. Watson
(74) *Attorney, Agent, or Firm*—Lowe Hauptman Gilman & Berner, LLP

(57) ABSTRACT

An assembly for providing air assisted insertion of a draw line such as a string line or the like through a conduit or network of conduits; the assembly comprising: a pneumatic gun (1) including a housing having an internal chamber with an entrance and an exit, a handle (3) attached to or integral with said housing and having a bore therethrough in communication with said internal chamber (2) and at an entrance to said bore means to facilitate receipt of pressurized air from a pressurized air source (4); a spool unit (41) integrally or detachably connected direct or indirectly to said pneumatic gun (1) and which receives and retains therein a line spool, or cartridge, said spool unit (41) including a chamber which terminates in an opening in communication with the internal chamber of said pneumatic gun and through which a line on said line spool travels; wherein, upon actuation of a trigger on the pneumatic gun (1) pressurized air from the air source (4) urges the draw line, through the gun and upon exiting said internal chamber into the conduit or network of conduits.

20 Claims, 7 Drawing Sheets

ASSEMBLY FOR INSERTION OF A DRAW LINE IN A CONDUIT

BACKGROUND

Figure 1:
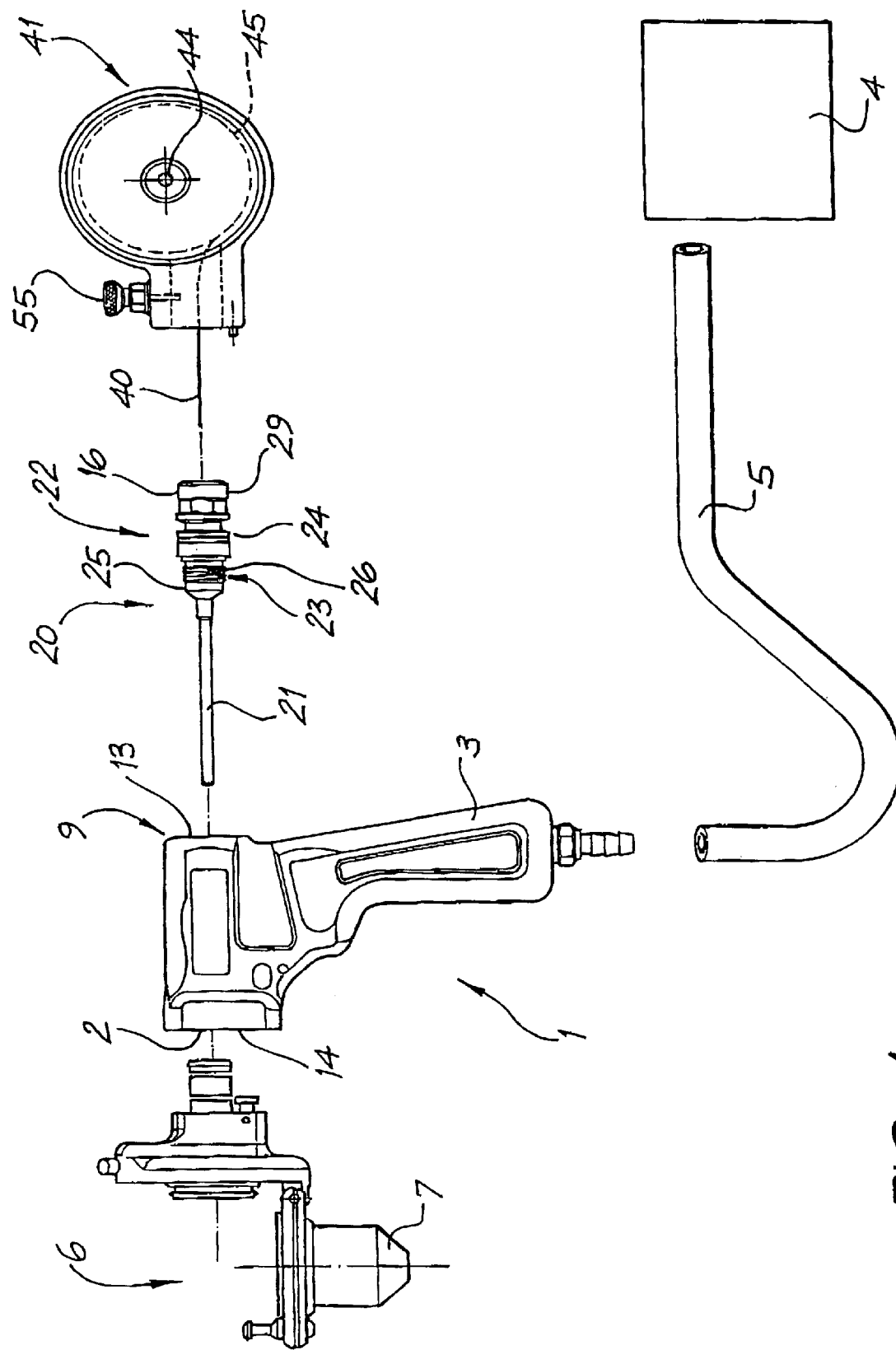

The Present invention relates to a method and apparatus for cleaning of and insertion of a draw line in a conduit and particularly small to medium sized conduits. The method is applicable for insertion of draw lines in a wide variety of conduits including water and electrical conduits. It will be appreciated that the application of the invention should not be limited to the types of conduit specifically mentioned by way of example.

PRIOR ART

Insertion of draw lines in small to medium sized conduits has been a problem for some time. It has in the past proved particularly difficult to insert cables in conduits of small diameter for example electrical conduit especially where those conduits include bends. Electricians very often are required to feed electrical cable through small diameter conduits having awkward 90° and 120° bends causing bending or bunching of the cable at the bends. Previously, to overcome this problem, feeding had to be done piece by piece using separate and detachable bend fittings.

Ideally, insertion of the cable in a conduit is best effected by pulling the cable through a conduit rather than pushing it through, but the former can only be effected if a drawline is inserted into the length of conduit from an inlet to an outlet end but achieving this is difficult particularly where the pipe network includes bends as is usually the case with electrical conduits. The same problem occurs in any pipe network system such as in water or gas pipes where they may need to be internally cleaned. It is infeasible to push cleaning probes into pipes particularly those of narrow diameter as they become jammed and often cannot be retrieved. Also, where the network includes sharp bends it is not possible to clean the pipe network from beginning to end and throughout the network due to the extreme difficulty in inserting cleaning cloths or analogous cleaning apparel inside a conduit.

INVENTION

In one form, the present invention provides an assembly for air assisted insertion of a draw line or the like through a conduit or pipe network of conceivably almost any length. The assembly according to one embodiment generally includes;
 a pneumatic gun which regulates the flow of pressurised air from an air source, a spool unit including a chamber for receiving and holding a spool of string, and guide means to guide the string from said chamber into said conduit via said pneumatic gun. The assembly according to the invention provides a convenient, quick and efficient, cost effective method for insertion of a draw line in a conduit. The assembly is ideally suited for small diameter conduits such as those in the 10–100 mm range and particularly those including bends, where it would normally be difficult to feed a cable through the conduit or (where the conduit or pipe is to be cleaned), to insert cleaning cloth or like apparel into the pipe.

In one broad form the present invention comprises;
 an assembly for providing air assisted insertion of a draw line such as a string line or the like in and through a conduit or network of conduits; the assembly including;
  a pneumatic gun with a housing having an internal chamber having an entrance and an exit, a handle attached to or integral with said housing and having a bore therethrough in communication with said internal chamber, and at an entrance to said bore coupling means to facilitate receipt of pressurised air from a pressurised air source;
  a spool unit integrally or detachably connected directly or indirectly to said pneumatic gun and which receives and retains therein a draw line spool or cartridge, said spool unit including an internal chamber which terminates in an opening in communication with the internal chamber of said pneumatic gun and through which a line on said line spool travels; wherein, upon actuation of a trigger on the pneumatic gun, pressurised air from the air source urges the draw line through the gun and upon exiting said internal chamber into the conduit.

Preferably, the assembly includes a line guide at least partially located in a bore of the gun and within the internal chamber and which guides the line through the gun until it enters the conduit. The spool unit is either integrally or detachably connected to the line guide which in turn is fitted to the gun. The pressurised air supply is delivered via a hose through the handle of the gun and into the bore such that it passes about the line guide and urges the line as it exits the line guide along the conduit. A pellet or line traveller is tied at the leading end of the draw line which guides the draw line through a conduit in which it is injected. The gun also preferably includes a head assembly which receives an adaptor having an orifice of a predetermined size selected according to the diametric size of the pipe in which the line is to be placed. Thus an end of the adaptor will ideally have an external diameter less than the internal diameter of a pipe in which the draw line is to be inserted.

In an alternative form the present invention comprises;
 a line guide for use with an assembly for air assisted insertion of a draw line in a conduit, the line guide comprising:
  a generally elongate body having a leading end and a trailing end, wherein the leading end includes a tubular member having a bore therethrough and wherein the trailing end comprises means to enable connection of said line guide to a pneumatic gun, and means to enable connection of a spool unit to said line guide each said means having a through passage in communication with said bore through which a draw line is fed.

In another form of the apparatus aspect the invention comprises; a spool unit for use with an assembly for air assisted insertion of a draw line in a conduit; the unit including a generally cylindrical body, defining an internal chamber, a shaft mounted on the body and inside said chamber and which receives and supports a line carrying spool; means on the body enabling connection of the body either directly or indirectly to a pneumatic gun, such that the internal chamber communicates via an opening through which the line exits, with a bore inside a line guide inserted inside the pneumatic gun; and further including a braking assembly to control the degree of rotation of the spool upon actuation of the air assisted insertion assembly.

According to a preferred embodiment the chamber comprises a detachable cover which allows access to the inside of the chamber for insertion of the spool.

According to a preferred embodiment the spool unit comprises first and second body parts each of which include a generally cylindrical skirt formation having a free end defining an opening and an opposite end wall, wherein an axle or shaft is attached to said end wall of one or other of said body parts, said axle receiving and retaining a line spool for rotation about said axle, each said skirt formations including corresponding mating profile parts which enable opposing engagement of said first and second body parts so as to form said spool unit.

Preferably, the spool unit comprises a braking assembly including a braking member biased so as to bear against a spool flange or wall when the spool is inserted inside the chamber defined by engagement of the first and second body parts, said braking member comprising; a disc mounted on a shaft, a first end of which engages in axial alignment with a free end of the axle of a first body part and the second end of which engages and is supported by the end wall of the second body part, a fibre ring disposed about the periphery of the disc adapted to engage under the action of said bias the wall of a spool inserted in said chamber.

The first body part also includes a fibre ring which engages an opposite wall or flange of the spool to regulate rotation thereof. In an alternative embodiment, the second element further includes means to increase or decrease the level of said bias to thereby adjust the level of braking of rotation of said spool.

According to a method aspect the present invention comprises; a method for air assisted insertion of a draw line in a conduit comprising the steps of:

a) taking an assembly comprising a pneumatic gun capable of controlling and regulating delivery of air, and a spool unit including an internal chamber for receiving and retaining a spool for holding a draw line;

b) attaching directly or indirectly the spool unit to the gun so that an opening in said chamber allows passage of the draw line through a chamber in the gun, c) prior to or after attaching the spool unit to the gun, inserting the spool onto an axis on the body of said spool unit and inside the chamber so that the spool is free to rotate in the chamber;

d) feeding the draw line through the opening in the chamber and into the chamber of the gun, e) attaching a hose or tube to the gun enabling communication between a pressurised air source and the gun;

f) actuating the gun so that the pressurised air so released urges the draw line through the chamber and into a conduit via an exit of said gun chamber until it exits the conduit.

According to a preferred embodiment, the method comprises the additional step of prior to connection of the spool chamber to the gun, inserting a line guide into the bore of the gun, fixedly attaching it to the gun thence attaching the spool chamber to the gun.

According to the preferred embodiment the spool unit is attached to a rear end of the pneumatic gun whereupon on actuation of a trigger on the gun, air travels from the pressurised air source along the outside of the line guide and wherein the draw line travels along the inside of the line guide prior to entry into the conduit.

Figure 2:
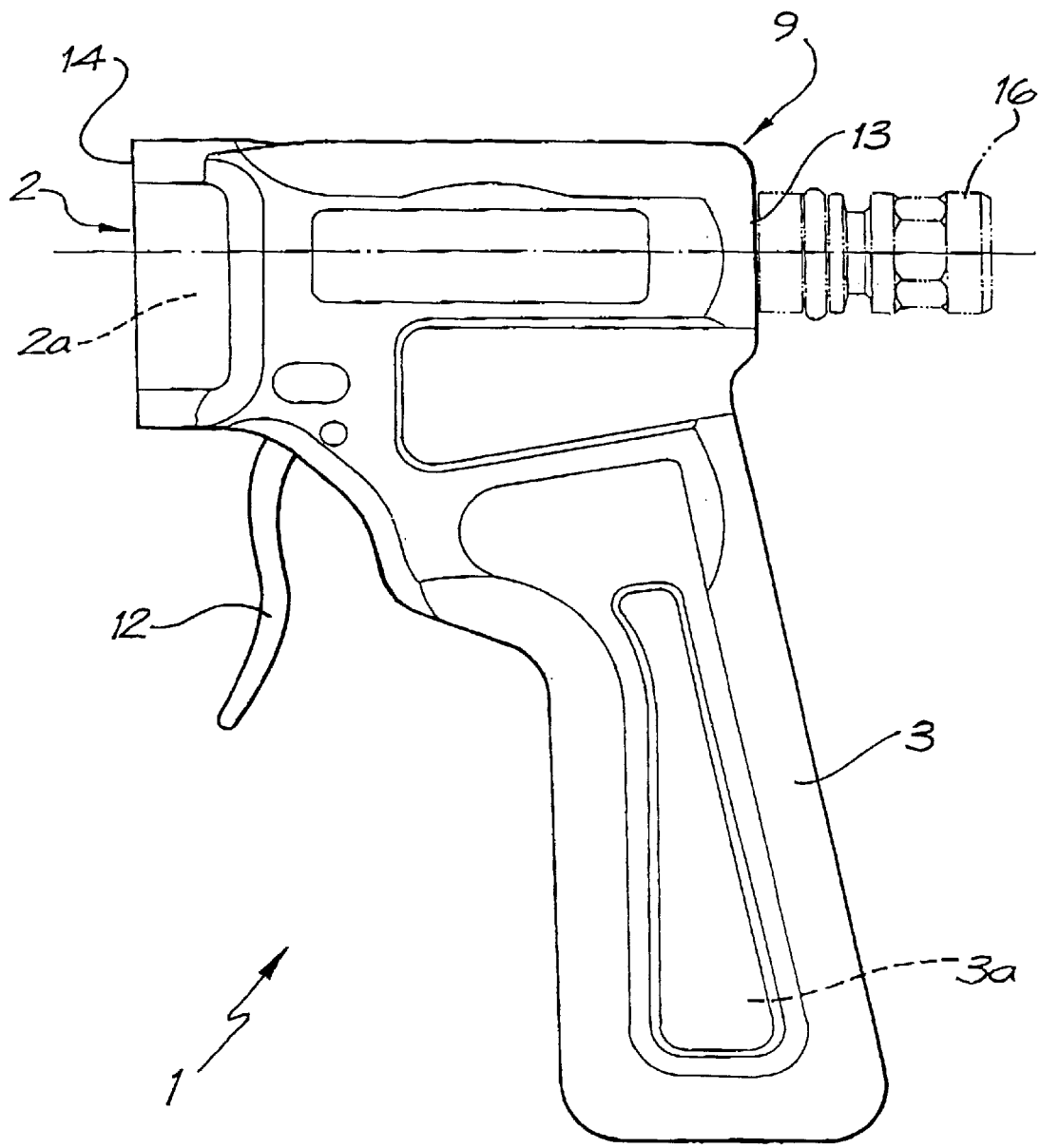
Figure 3:
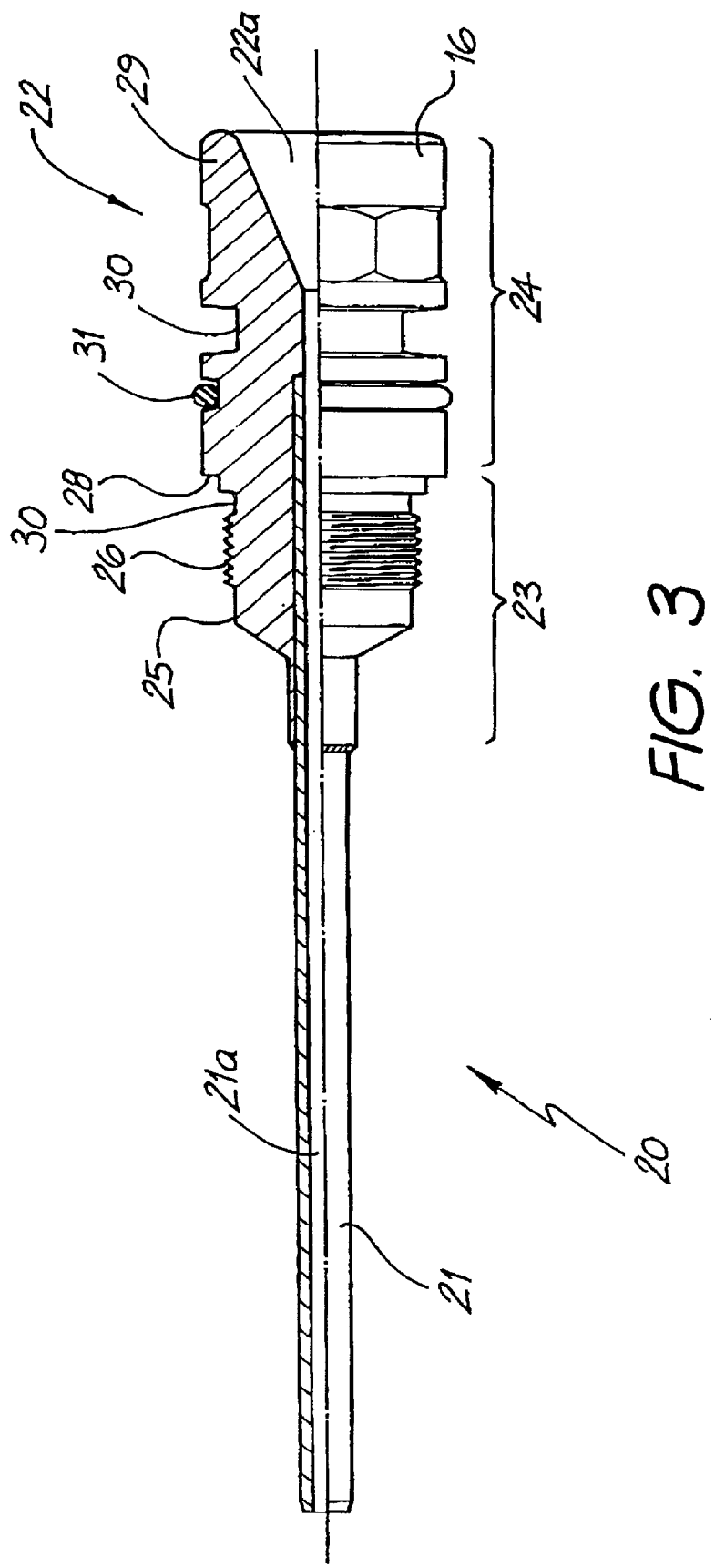
Figure 4:
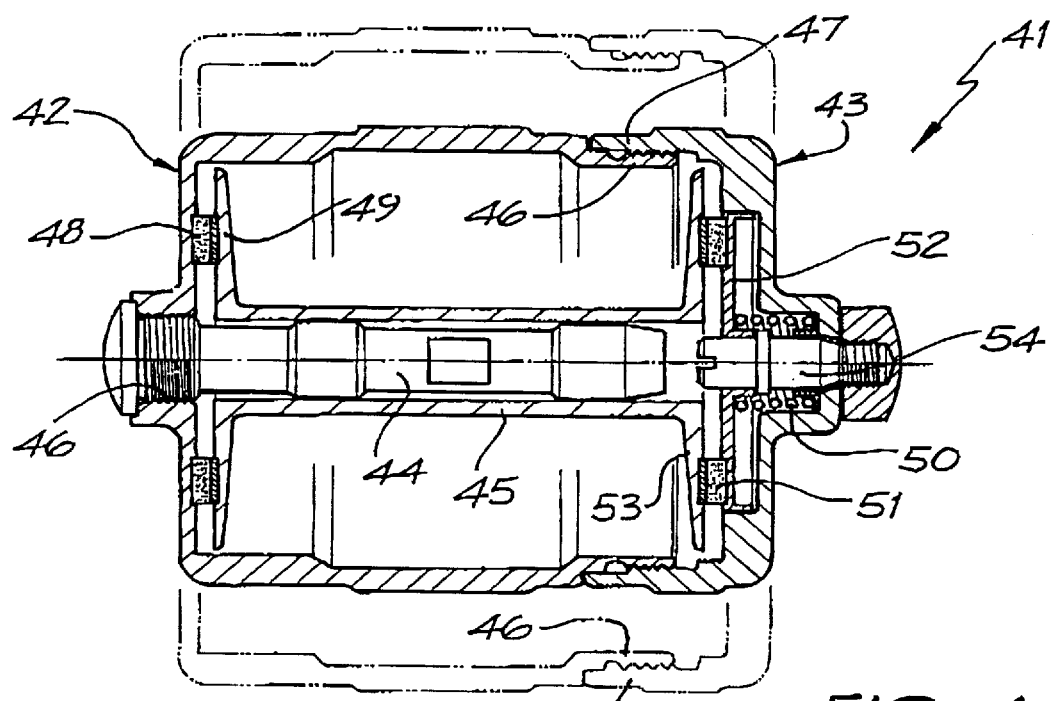
Figure 5:
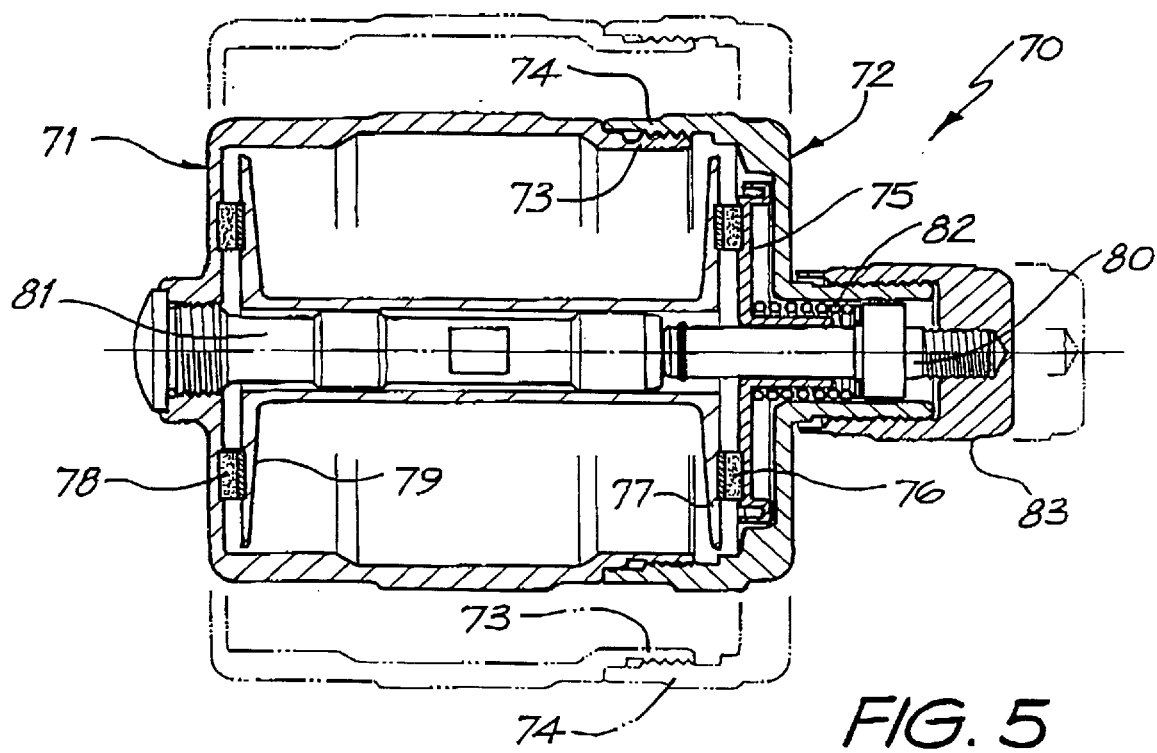
Figure 6:
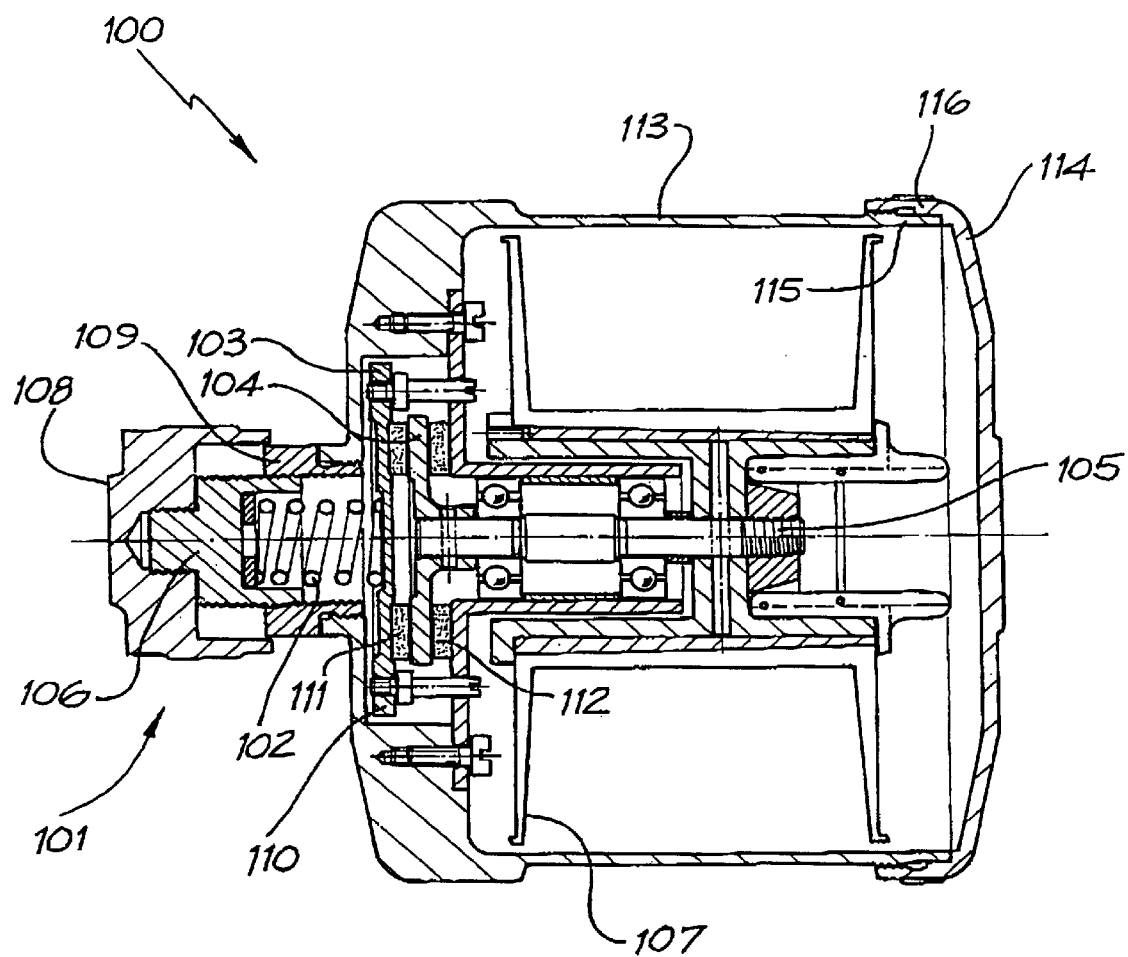
Figure 7:
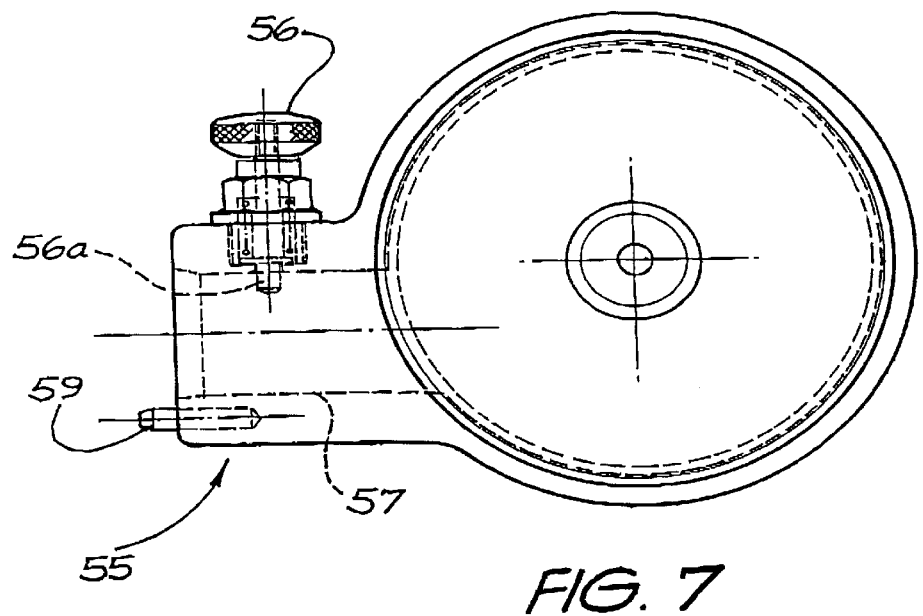
Figure 8:
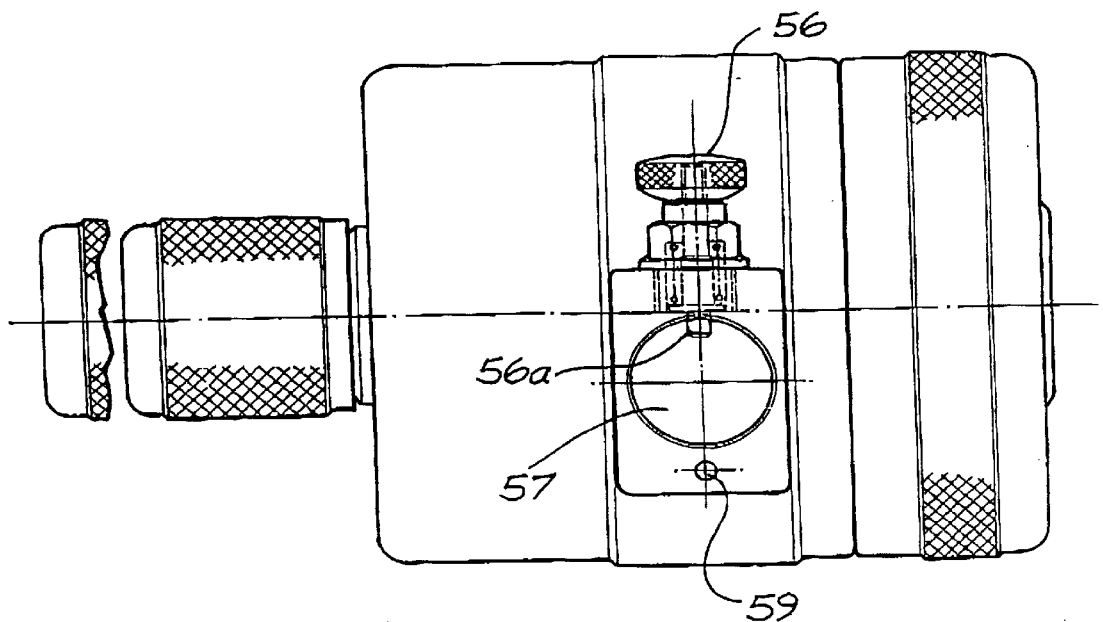

The present invention will now be described in more detail according to a preferred embodiment and with reference to the accompanying illustrations wherein:

FIG. 1: Shows according to a preferred embodiment an exploded layout of the assembly for air assisted insertion of a draw line into a conduit;

FIG. 2: shows a pneumatic gun body according to a preferred embodiment;

FIG. 3: shows a line guide for insertion into a gun according to a preferred embodiment;

FIG. 4: shows a long section of a preferred embodiment of a spool unit with braking assembly;

FIG. 5: shows a section of an alternative embodiment of a spool unit chamber incorporating for adjustment of the braking assembly;

FIG. 6: shows a section an alternative embodiment of a spool unit chamber with an assembly for adjustable braking;

FIG. 7: shows a side elevation of the spool unit chamber of FIG. 6;

FIG. 8: shows an end elevation of the spool unit chamber of FIG. 7; and

Figure 9:
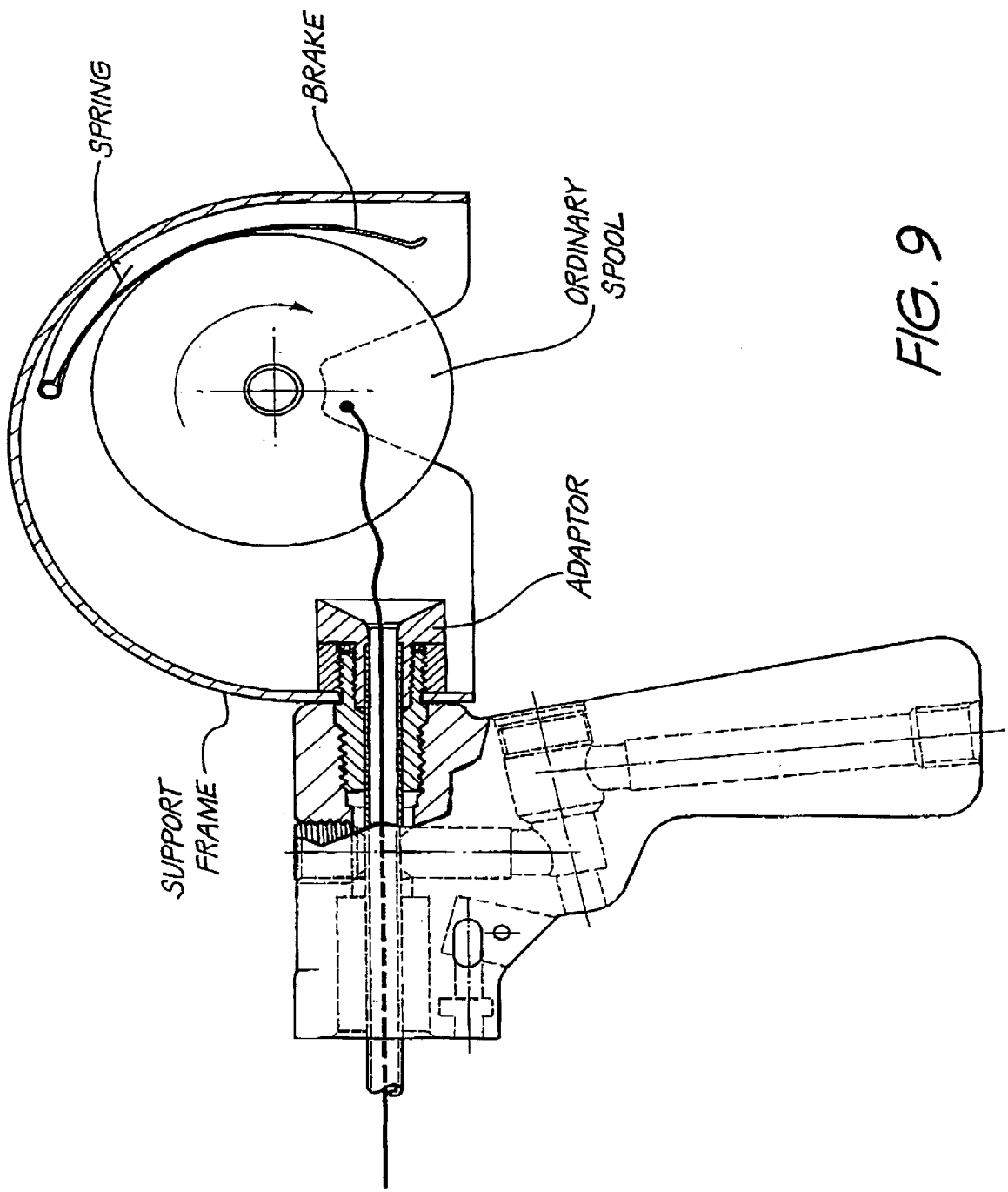

FIG. 9: shows an arrangement with a draw line travelling through the line guide according to an alternative embodiment.

Referring now to FIG. 1 there is shown a layout of an assembly for insertion of a draw line in a conduit according to a preferred embodiment of the invention.

The assembly comprises pressurised air regulating gun 1 having an internal chamber incorporating bore 2 and gripping handle 3 in communication with a source of pressurised air 4. In use, pressurised air communicates between air source 4 and gun 1 via air hose 5. Gun 1 includes detachable head 6 which receives a cartridge which engages a pipe end through which the draw line 40 is to be inserted. The head provides means to enable fitting of different sized cartridges according to the size of the pipe into which the draw line is to be inserted. Gun 1 receives line guide 20 through which draw line 40 travels before it enters the pipe in which the draw line is to be inserted or which is to be cleaned.

Line guide 20 comprises line tube 21 and coupling 22 in axial alignment therewith. Coupling 22 includes bore 22a which will be in alignment with bore 2 of pneumatic gun 1. Tube 21 is inserted into the gun 1 via rear opening 13 and along bore 2 terminating at the end 14 of bore 2. Coupling 22 is fixedly attached to gun 1 at opening 13 leaving end portion 16 extending beyond the rear of the gun. Spool unit 41 attaches to coupling 22 via male/female or female/male interfitting and is locked by means of locking pin 55 which may be screwed or spring biased into position. Spool unit 41 receives spool 45 which is retained on axle 44.

FIG. 2 shows a pneumatic gun 1 similar to that shown in the assembly of FIG. 1. Gun 1 comprises bore 2 incorporated in internal chamber 2a in communication with a passage 3a (obscured) in handle 3. In use, pressurised air from air source 4 travels via hose 5 through passage 3a and through internal chamber 2a until it exits gun 1 via gun head assembly 6 (see FIG. 1). Gun 1 has at its rear end 9 an opening 13 to receive line guide 20 (see FIG. 3). Line guide 20 may be threadably connected at opening 13. Gun 1 also comprises a releasable head 6 assembly which receives adaptor 7 through which a draw line 40 exits prior to entry into the pipe. Head 6 assembly is releasable and receives adaptors of different sizes according to the diametric size of the pipe in which the draw line is to be inserted. Gun 1 also comprises a trigger 12 which allows the user to regulate the flow of pressurised air through the gun.

Referring to FIG. 3 there is shown a line guide 20 comprising tube 21 and coupling 22. Tube 21 includes a through passage 21a in communication with a through passage 22a in coupling 22. The line guide has two important functions. Firstly, it provides guidance for draw line 40 between spool unit 41 and a pipe in which it is to be inserted and secondly it facilitates connection of the spool unit 41 to the gun 1. Line guide 20 includes a connecting region 23 which facilitates connection of the line guide 20 to gun 1 and second region 24 which facilitates connection of the spool unit 41. Region 23 comprises a male profile part 25 which interfits with opening 13 in gun 1. The connection is preferably effected by means of male thread 26 engaging with a corresponding female thread (not shown) in opening 13. Guide 20 is inserted into gun 1 as far as shoulder 28. The function of second region 24 will now be described with reference to its role in connecting the spool unit 41 to the gun. When line guide 20 is fully inserted into gun 1 region 24 projects from the rear of the gun. Spool unit 41 can then be attached directly to region 24. Region 24 includes male profile part 29.

Referring to FIG. 4 there is shown a long section of the spool unit 41 according to a preferred embodiment of the invention. The embodiment shown comprises detachable chamber body parts 42 and 43. Part 42 is substantially cylindrical and includes integrally formed therewith an axle 44 about which rotates spool 45. Alternatively, though not shown part 43 may be adapted with an axle. Axle 44 may be screwed into a suitable opening 46 in body 42 or it may be set such that body 42 is moulded about it. In any event, axle 44 is rigidly connected to body 42. At the open end of body part 42 is a profiled skirt terminating in end 46 which releasably engages corresponding end 47 of body part 43. Once these parts are engaged spool 45 is held in position. Body part 43 includes an assembly which enables braking of spool 45 when in use. Body part 42 includes fibre ring 48 which frictionally engages flange or wall 49 of line spool 45. Spool 45 is urged against ring 48 under the action of compression spring 50. Likewise fibre ring 51 connected to disc 52 frictionally engages spool flange 53. The rotational speed of spool 45 is dependent upon the degree of compression of spring 50. Part 43 includes a short axle 54 which engages axle 44 when part body 43 engages body part 42. This action causes the spring to compress which keeps frictional pressure on flanges 49 and 53 thereby effecting the required braking which is predetermined to prevent over spinning of spool 25 when the assembly is in use.

Referring to FIG. 5 there is shown an alternative spool unit 70 including an adjustable braking arrangement. Spool chamber 70 is assembled in much the same way as that described for spool unit 41. Spool unit 70 comprises body parts 71 and 72 which inter fit together by engagement of corresponding profile parts 73 and 74 respectively. Part 72 includes disc 75 bearing fibre ring 76 which impinges on flange 77. Likewise fibre ring 78 impinges on flange 79 in order to effect braking. Spool unit 70 differs from spool unit 41 in the adjustability of the braking arrangement. Part 72 includes axle 80 which engages axle 81 integral with part 71. Disc 75 is mounted on axle 80 retaining biasing spring 82. Attached to part 72 is nut 83 which when turned compresses spring 82 thereby increasing the frictional engagement between fibre rings 76 and 78 flanges 77 and 79 respectively thereby effecting braking. The braking force is adjusted by rotation of nut 83 which increased compression on spring 82. This urges disc 75 onto flange 77 with greater frictional force. Similarly flange 79 is urged against fibre ring 78 with additional force resulting in an overall increase in braking capability.

FIG. 6 shows a long sectional view of a spool unit 100 with braking assembly 101 according to an alternative embodiment. Braking assembly 101 comprises compression spring 102 which bears on plate 103. Compression of spring 102 urges plate 103 against disc 104 mounted about axle 105 which effects braking by frictional engagement. The degree of braking can be adjusted by rotation of nut 106 which increases or reduces, depending upon which direction it is turned, the energy in spring 102. Spool 107 can then be rotated at a predetermined speed according to the rate of delivery of the line required.

In this embodiment, spring 102 is compressed when cap 108 engages member 109 and this in turn induces a compression force via plate 110. Disc 104 is sandwiched between fibre rings 111 and 112 which engage disc 104 creating frictional braking to an extent according to the degree of compression induced by spring 102. This action in turn regulates the extent of rotation of spool 107 and thus the rate at which a line about spool 107 (not shown) is unfurled. Spool unit 100 includes body parts 113 and 114 which mate via corresponding profile parts 115 and 166 which are at the terminal end of skirt formations on each of body parts 113 and 114.

FIG. 7 shows a side elevation of the spool unit of FIG. 6. The spool unit includes a connecting assembly 55 which includes locking pin 56 which engages with second region 24 of line guide 20. As can be seen from FIG. 3, region 23 comprises a male profile 29 including sealing ring 31 and annular recess 30 which receives locking pin 56. The arrangement is such that spool unit 41 may be push fitted onto region 24 via female connector 57. When this occurs end 56a of locking pin 56 enters recess 30 to effect locking of spool unit to the gun. To prevent rotation of spool unit 45 there is provided a locking pin 59 which engages a corresponding recess 14 in pneumatic gun 1. Draw line 40 may be manually fed into line guide 20 prior to coupling of the spool unit 41 with region 25. Alternatively, the spool unit and line guide 20 can be coupled prior to connection of the line guide to the gun. The draw line must be fed through tube 21 until it exits the gun head 6. With the line emerging from tube 21 a pellet may be tied to its free end which is then inserted into line 8 for either cleaning or simply insertion of the draw line. FIG. 8 shows an end elevation view of the spool unit of FIG. 7.

In an alternative embodiment the gun and spool unit may be constructed as an integral unit.

It will be recognised by persons skilled in the art that numerous variations and modifications may be made to the present invention as broadly described herein without departing from the overall spirit and scope of the invention.

What is claimed is:

1. An assembly for providing air assisted insertion of a draw line through at least one of a conduit and a network of conduits; the assembly comprising: a pneumatic gun including a housing having an internal chamber with an entrance and an exit, a handle fixedly associated with said housing and having a bore therethrough in communication with said internal chamber, and at an entrance to said bore means to facilitate receipt of pressurised air from a pressurised air source; a spool unit connected to said pneumatic gun and which receives and retains therein a line spool, said spool unit including a chamber which terminates in an opening in communication with the internal chamber of said pneumatic gun and through which a line on said line spool travels, and an adjustable braking assembly within the spool unit chamber which engages the line spool to control rotation of the spool; wherein, upon actuation of a trigger on the pneumatic gun, pressurised air from the air source urges the draw line through the gun and upon exiting said internal chamber into the said at least one of said conduit and said network of conduits.

2. An assembly according to claim 1 further comprising a line guide including a bore therethrough having entry and exit ends and which communicates between the spool unit chamber and the internal chamber of said pneumatic gun and through which said line travels upon actuation of said trigger.

3. An assembly according to claim 2 wherein the spool unit, line guide and gun are integrally fixed together.

4. An assembly according to claim 2 wherein the spool unit and line guide are detachably attached to said pneumatic gun.

5. An assembly according to claim 3 wherein the internal chamber of said gun includes a bore wherein said bore and the bore of the line guide are substantially concentric when the line guide is attached to said gun.

6. An assembly according to claim 5 wherein the line guide includes a line feeder integrally fixed to a coupling assembly which enables fitment of said line guide to said gun and said spool unit to said line guide.

7. An assembly according to claim 6 wherein said line guide bore communicates in alignment between said coupling and said line feeder.

8. An assembly according to claim 7 wherein said coupling includes a connection member to enable detachable attachment of said line feeder to said gun.

9. An assembly according to claim 8 wherein, when said line feeder is attached to said gun, a part of the line feeder extends from a rear end of the gun and receives and retains said spool unit.

10. An assembly according to claim 9 wherein the spool unit includes detachable body parts each including a depending skirt which mate via profiled ends and enclose said spool unit chamber and when removed, allow access to the spool unit chamber.

11. An assembly according to claim 10 wherein one or both of said body parts includes an integral axle about which the line spool rotates upon actuation of the trigger on the pneumatic gun and responsive to the action of pressurised air on the draw line.

12. An assembly according to claim 11 wherein the braking assembly is attached to one of said body parts and comprises an axle which engages said integral axle and about which is disposed a braking disc to which is attached a first fibre ring which engages a first flange of said spool to effect braking.

13. An assembly according to claim 12 wherein the braking assembly further comprises a second fibre ring attached to one of said body parts and which engages a second flange of said spool such that said spool is sandwiched between said first and second fibre rings when the braking assembly is actuated.

14. An assembly according to claim 13 wherein braking of said spool is effected by friction between said first fibre ring and said first flange and said second fibre ring and said second flange.

15. An assembly according to claim 14 wherein the leading end of said draw line includes a traveller to facilitate passage of the draw line along the conduit.

16. An assembly according to claim 15 wherein the pneumatic gun further comprises means at an exit end of said internal chamber to detachably receive a head assembly.

17. An assembly according to claim 16 wherein the head assembly receives adaptors of a pre-selected size and which engage an entry end of a conduit into which said draw line is to be inserted.

18. An assembly according to claim 17 wherein the head is adapted to releasably snap fit to said exit end of said internal chamber of said gun.

19. An assembly according to claim 18 wherein the head assembly includes a moveable gate pivotally connected to the body of said head, said gate receiving said adaptor of a pre-selected size prior to rotational closure of said gate against said body of said head assembly.

20. An assembly according to claim 19 wherein the gun handle includes an adaptor which receives a pressurised air line for delivery of pressurised air to said gun from said pressurised air source.

* * * * *